US012766512B2

(12) United States Patent
Yamashita et al.

(10) Patent No.: US 12,766,512 B2
(45) Date of Patent: Oct. 20, 2026

(54) NUCLEIC ACID ANALYZER

(71) Applicant: HITACHI HIGH-TECH CORPORATION, Tokyo (JP)

(72) Inventors: Tatsuya Yamashita, Tokyo (JP); Tomohiro Shoji, Tokyo (JP); Kazutoshi Onuki, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 719 days.

(21) Appl. No.: 17/928,997

(22) PCT Filed: Jun. 3, 2020

(86) PCT No.: PCT/JP2020/022025
§ 371 (c)(1),
(2) Date: Dec. 1, 2022

(87) PCT Pub. No.: WO2021/245859
PCT Pub. Date: Dec. 9, 2021

(65) Prior Publication Data
US 2023/0219088 A1 Jul. 13, 2023

(51) Int. Cl.
*B01L 3/00* (2006.01)
*B01L 7/00* (2006.01)
*G01N 21/64* (2006.01)

(52) U.S. Cl.
CPC ........... *B01L 3/502761* (2013.01); *B01L 7/52* (2013.01); *G01N 21/6428* (2013.01); (Continued)

(58) Field of Classification Search
None
See application file for complete search history.

(56) References Cited

U.S. PATENT DOCUMENTS 8,241,573 B2 8/2012 Banerjee et al.
2004/0121356 A1* 6/2004 Yamagata ............. B01L 3/5027 435/287.2
(Continued)

FOREIGN PATENT DOCUMENTS

EP 0969083 A1 1/2000
JP H07-274935 A 10/1995
(Continued)

OTHER PUBLICATIONS

Search Report mailed Aug. 25, 2020 in International Application No. PCT/JP2020/022025.
(Continued)

*Primary Examiner* — Matthew D Krcha
(74) *Attorney, Agent, or Firm* — Miles & Stockbridge, P.C.

(57) ABSTRACT

The purpose of the present invention is to provide a nucleic acid analyzer which prevents an increase in reagent consumption caused by a branched channel structure and on which multiple kinds of substrates having different channel numbers can be mounted. The nucleic acid analyzer according to the present invention is provided with a first substrate that comprises an inlet section connected to an introduction path, a first outlet section connected to a first discharge path, a second outlet section connected to a second discharge path, a first channel guiding a reagent from the inlet section to the first outlet section, a second channel guiding the reagent from the inlet section to the second outlet section, and a branching section branching, from the inlet section, into the first and second channels, wherein the first and second channels are connected to each other exclusively at the branching portion (see FIG. 1).

11 Claims, 9 Drawing Sheets

(52) U.S. Cl.
CPC .. *G01N 21/6456* (2013.01); *B01L 2200/0647* (2013.01); *B01L 2200/16* (2013.01); *B01L 2300/0877* (2013.01); *B01L 2300/18* (2013.01); *B01L 2400/0622* (2013.01)

(56) References Cited

U.S. PATENT DOCUMENTS

| | | | |
|---|---|---|---|
| 2004/0146874 | A1 | 7/2004 | Inami et al. |
| 2005/0266582 | A1 | 12/2005 | Modlin et al. |
| 2010/0111768 | A1 | 5/2010 | Banerjee et al. |
| 2011/0072914 | A1* | 3/2011 | Lebl ...................... F04B 19/006 73/864.11 |
| 2013/0017538 | A1* | 1/2013 | Ionescu-Zanetti ...... B03C 1/288 435/6.12 |
| 2015/0276692 | A1* | 10/2015 | Olson ...................... B01J 19/18 436/37 |
| 2016/0208315 | A1 | 7/2016 | Ogino et al. |
| 2017/0191924 | A1* | 7/2017 | Pristinski ........... G01N 15/1434 |
| 2017/0314070 | A1 | 11/2017 | Lee et al. |
| 2018/0246020 | A1 | 8/2018 | Kitagawa et al. |

FOREIGN PATENT DOCUMENTS

| | | | | |
|---|---|---|---|---|
| JP | 2004-028589 | A | 1/2004 | |
| JP | 2005-090995 | A | 4/2005 | |
| JP | 2009-532031 | A | 9/2009 | |
| JP | 2015-065956 | A | 4/2015 | |
| JP | 2018-500927 | A | 1/2018 | |
| JP | 2018-141686 | A | 9/2018 | |
| JP | 2019-187256 | A | 10/2019 | |
| JP | 2020-020601 | A | 2/2020 | |
| WO | 2007058077 | A1 | 5/2007 | |
| WO | 2007123744 | A2 | 11/2007 | |
| WO | WO-2009010970 | A2 * | 1/2009 | ............ B01J 19/004 |
| WO | 2015098784 | A1 | 7/2015 | |
| WO | 2020100659 | A1 | 5/2020 | |

OTHER PUBLICATIONS

Written Opinion mailed Aug. 25, 2020 in International Application No. PCT/JP2020/022025.

Office Action mailed Mar. 19, 2024 in Japanese Application No. 2022-529235.

Search Report mailed Jan. 31, 2024 in European Application No. 20939354.5.

Office Action mailed Mar. 12, 2025 in Chinese Application No. 202080101462.6.

* cited by examiner

NUCLEIC ACID ANALYZER

TECHNICAL FIELD

The present invention relates to a nucleic acid analyzer.

BACKGROUND ART

A nucleic acid analyzer is known as a device for analyzing base sequences of a deoxyribonucleic acid (DNA). The nucleic acid analyzer is a device for analyzing the base sequences of DNA by denaturing DNA fragments into a single strand, using the single strand as a model, extending a nucleic acid attached with a fluorescent label by one base each time, and sequentially capturing a fluorescent image. When analysis is performed, a substrate in which a flow path is provided in a plate made of a partially or entirely transparent material is prepared, and colonies containing a plurality of cloned DNA fragments denatured into a single strand are fixed in a reaction field provided in the flow path of the substrate. In order to enable identification of four types of nucleotides (adenine, cytosine, guanine, thymine) forming DNA for the colonies containing the plurality of DNA fragments, a reagent that fluorescently labels each base of DNA, a reagent that cleans the flow path, and the like are alternately sent. The base sequences of DNA can be sequentially analyzed by capturing, as a fluorescent image, a process in which the colonies are restored to contain the double-stranded DNA fragments.

In analysis of base sequences of DNA in the nucleic acid analyzer, first, for the colonies containing the plurality of DNA fragments fixed in the reaction field provided in the flow path of the substrate, a reagent required for each reaction process is selected from a plurality of types of reagents and is sent to the flow path of the substrate, and thus each base of the colonies containing the DNA fragments in the flow path is fluorescently modified. Further, the colonies containing the fluorescently modified DNA fragments are observed. The base sequences are analyzed as described above.

In such a nucleic acid analyzer, it is considered to increase an area of the reaction field by providing a plurality of flow paths on the substrate in order to improve throughput. A nucleic acid analyzer using a substrate having a plurality of flow paths is reported in PTL 1.

CITATION LIST

Patent Literature

PTL 1: U.S. Pat. No. 8,241,573B2

SUMMARY OF INVENTION

Technical Problem

PTL 1 describes a configuration of a nucleic acid analyzer that sends a reagent to a substrate having a plurality of flow paths. However, the nucleic acid analyzer in PTL 1 requires a branched flow path structure for connecting reagents with a plurality of substrate flow paths in order to introduce the reagents into the plurality of flow paths, and the substrate flow paths and the branched flow path are both required to be replaced with the reagents, and thus a reagent consumption amount increases.

In addition, when it is considered to use substrates of different sizes in order to cope with a plurality of types of throughput (for example, a substrate having a half number of flow paths is used in order to implement nucleic acid analysis at half throughput), a branched flow path that is not connected to the substrate is generated in the branched flow path structure. A branched flow path portion that is not connected to the substrate becomes a dead volume, and a remaining drug solution or bubbles cannot be replaced with the reagents, thereby causing contamination. Therefore, it is not desirable to use substrates of different sizes.

In view of the above problems, an object of the invention is to provide a nucleic acid analyzer capable of mounting a plurality of types of substrates having different numbers of flow paths while preventing an increase in reagent consumption amount due to a branched flow path structure.

Solution to Problem

In the nucleic acid analyzer according to the invention, a first substrate includes an inlet portion connected to an introduction path, a first outlet portion connected to a first discharge path, a second outlet portion connected to a second discharge path, a first flow path configured to guide a reagent from the inlet portion to the first outlet portion, a second flow path configured to guide the reagent from the inlet portion to the second outlet portion, and a branch portion configured to branch the reagent from the inlet portion to the first flow path and the second flow path, in which the first flow path and the second flow path are connected to each other only at the branch portion.

Advantageous Effects of Invention

According to the nucleic acid analyzer of the invention, by providing a branch point of the flow paths in the substrate, it is possible to minimize the number of introduction flow paths and eliminate an increase in reagent consumption amount due to an increase in the number of flow paths of the substrate. Further, by stabilizing the number of inlet portions of the substrate regardless of the number of flow paths on the substrate, it is possible to mount a plurality of types of substrates having different numbers of flow paths without generating a dead volume in the same device configuration.

DESCRIPTION OF EMBODIMENTS

First Embodiment

Figure 1:
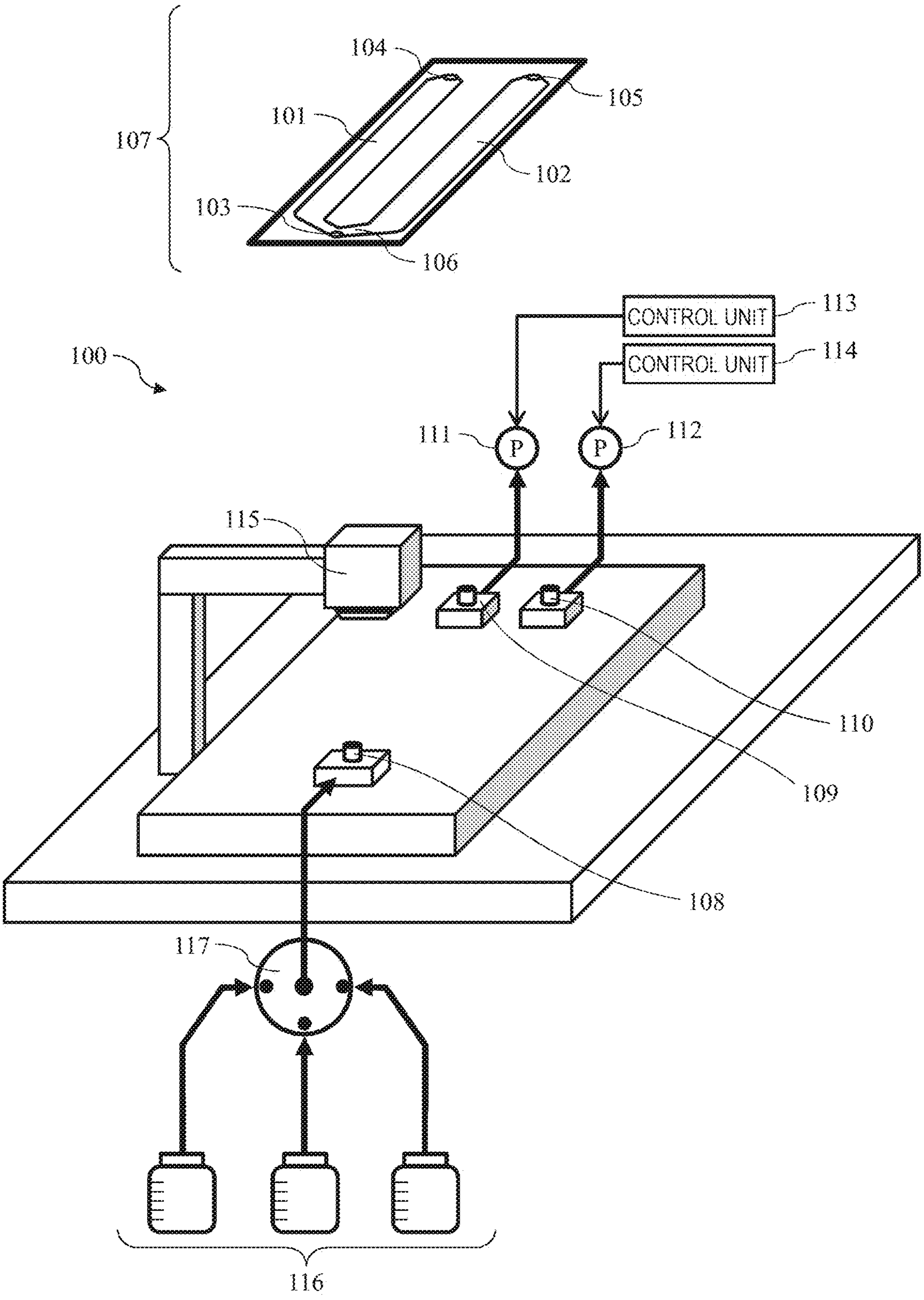
FIG. 1 shows a configuration diagram of a nucleic acid analyzer 100 according to a first embodiment.

FIG. 1 shows a configuration diagram of a nucleic acid analyzer 100 according to a first embodiment of the invention. The nucleic acid analyzer 100 includes a substrate 107, an introduction flow path 108, discharge flow paths 109 and 110, reagent aspiration mechanisms 111 and 112, control units 113 and 114, an imaging mechanism 115, reagent containers 116, and a reagent selection mechanism 117. The substrate 107 can be attached to and detached from a device main body. Other components are provided on a device main body side.

The substrate 107 includes at least two flow paths 101 and 102, at least one inlet portion 103, at least two outlet portions 104 and 105, and at least one flow path branch point 106. The flow paths 101 and 102 are used to fix colonies containing DNA fragments and analyze base sequences of DNA. Each reagent is introduced into the substrate 107 from the inlet portion 103. The reagent is discharged from the outlet portions 104 and 105. The flow path branch point 106 is a location at which a flow path is branched into flow paths (a merging point of the flow paths). The flow path 101 connects between the inlet portion 103 and the outlet portion 104, and the flow path 102 connects between the inlet portion 103 and the outlet portion 105.

The introduction flow path 108 is connected to the inlet portion 103. The reagent is introduced into the substrate 107 via the introduction flow path 108 and the inlet portion 103. The discharge flow path 109 is connected to the outlet portion 104, and the discharge flow path 110 is connected to the outlet portion 105. The reagent aspiration mechanism 111 aspirates the reagent flowing through the discharge flow path 109, and the reagent aspiration mechanism 112 aspirates the reagent flowing through the discharge flow path 110. The control unit 113 controls the reagent aspiration mechanism 111, and the control unit 114 controls the reagent aspiration mechanism 112. The imaging mechanism 115 captures a fluorescent image of the colonies containing the DNA fragments. Reagents are contained in the reagent containers 116. The reagent selection mechanism 117 selects a reagent to be introduced into the substrate 107 by selectively connecting to any one of the reagent containers 116.

In FIG. 1, one inlet portion 103 of the substrate 107 and one introduction flow path 108 are provided, and two or more inlet portions 103 and two or more introduction flow paths 108 may be provided as long as the number of the inlet portions 103 and the number of the introduction flow paths 108 are both smaller than the number of the outlet portions 104 and 105. In FIG. 1, two outlet portions 104 and 105 and two discharge flow paths 109 and 110 are provided, and the number of the outlet portions 104 and 105 and the discharge flow paths 109 and 110 may be three or more.

Figure 2:
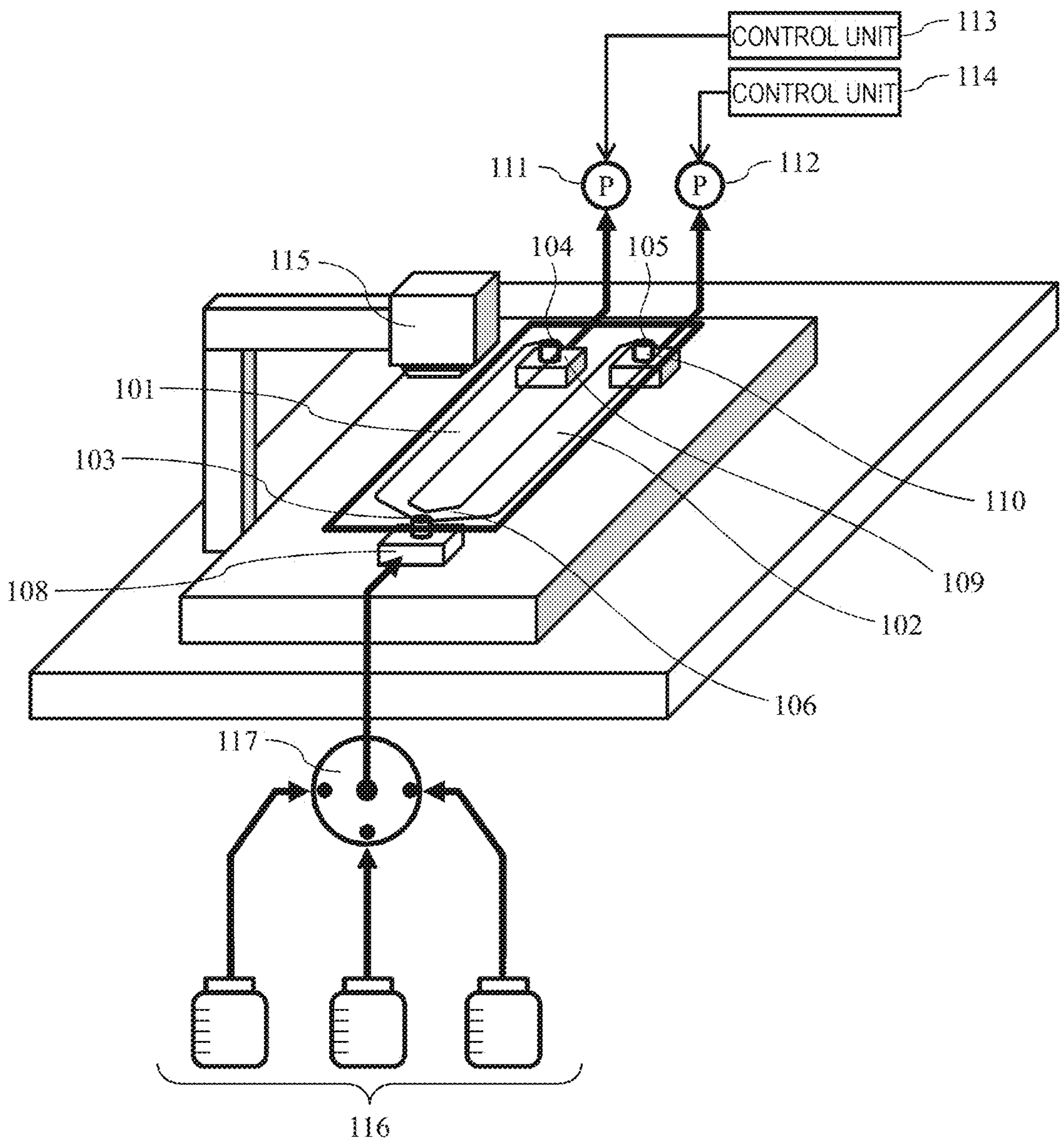
FIG. 2 shows a configuration diagram when a substrate 107 is mounted on the nucleic acid analyzer 100.

FIG. 2 shows a configuration diagram when the substrate 107 is mounted on the nucleic acid analyzer 100. The reagent selection mechanism 117 selects a reagent required for each reaction step. Next, the reagent aspiration mechanisms 111 and 112 aspirate the reagent. The amount of reagent flowing into the flow path 101 is controlled by the control unit 113, and the amount of reagent flowing into the flow path 102 is controlled by the control unit 114. By independently controlling a reagent aspirating amount by each reagent aspiration mechanism in such a manner, it is possible to introduce a desired reagent amount into each flow path.

As described above, in the substrate having a plurality of flow paths, the number of the introduction flow paths 108 can be minimized by providing the flow path branch point 106 on the substrate. Therefore, even when a branched flow path structure is provided, it is not necessary to replace a branched flow path on a device side with a reagent as in the related art, and thus it is possible to prevent excessive reagents from being consumed.

Figure 3:
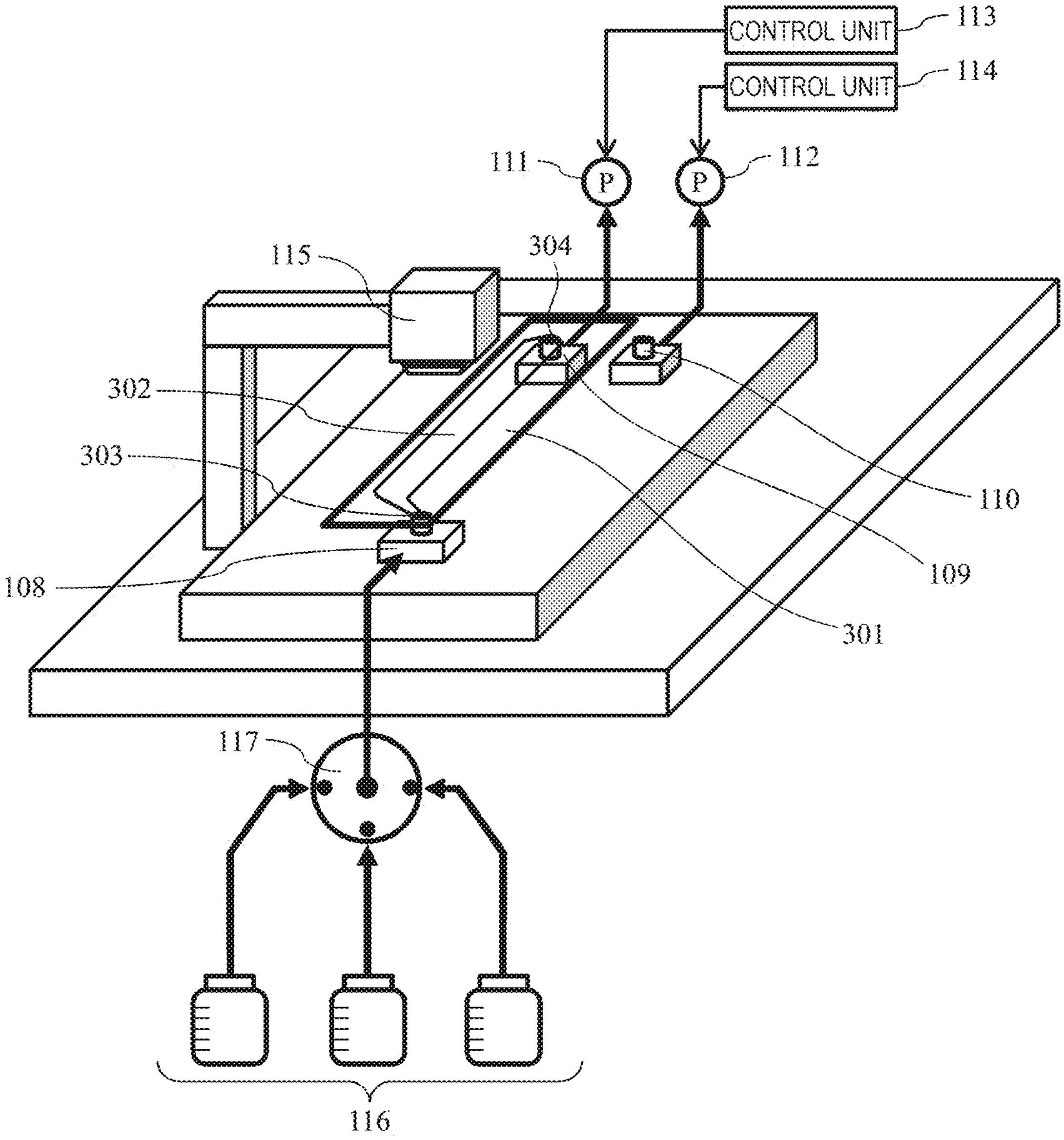
FIG. 3 shows a configuration diagram when a substrate 301 having a size different from that of the substrate 107 is mounted on the nucleic acid analyzer 100.

FIG. 3 shows a configuration diagram when a substrate 301 having a size different from that of the substrate 107 is mounted on the nucleic acid analyzer 100. The substrate 301 includes one flow path 302, one inlet portion 303, and one outlet portion 304. The inlet portion 303 is connected to the introduction flow path 108, and the outlet portion 304 is connected to the discharge flow path 109. The flow path 302 connects the inlet portion 303 and the outlet portion 304. The reagent aspiration mechanism 111 introduces the reagent into the flow path 302 of the substrate 301 via the reagent selection mechanism 117, the inlet portion 303, and the outlet portion 304.

As shown in FIG. 3, even when substrates 301 of different sizes are mounted, an unnecessary dead volume does not occur between the reagent containers 116 and the inlet portion 303. Therefore, contamination of the reagent and bubbles remaining in a branched flow path portion that is not connected (not used) to the substrate 301 as in the related art does not occur.

First Embodiment: Summary

In the nucleic acid analyzer 100 according to the first embodiment, the substrate 107 includes the flow path branch point 106, and a reagent is branched from the flow path branch point 106 to each flow path on the substrate 107. In other words, the flow path branch point 106 is disposed on a substrate 107 side. Accordingly, it is sufficient to provide the minimum number of introduction flow paths 108 on the device side (if one inlet portion 103 is provided, one introduction flow path 108 is also provided). Therefore, it is not necessary to replace the branched flow path on the device side with the reagent as in the related art, and thus it is possible to prevent a reagent consumption amount.

In the nucleic acid analyzer 100 according to the first embodiment, even when the substrate 107 is replaced with the substrate 301, no branched flow path that is not connected to the substrate 301 is generated, and thus unnecessary dead volume does not occur between the reagent containers 116 and the inlet portion 303. Therefore, it is possible to prevent contamination of the reagent or the bubbles remaining in the branched flow path portion that is not connected (not used) to the substrate 301 as in the related art.

Second Embodiment

Figure 4:
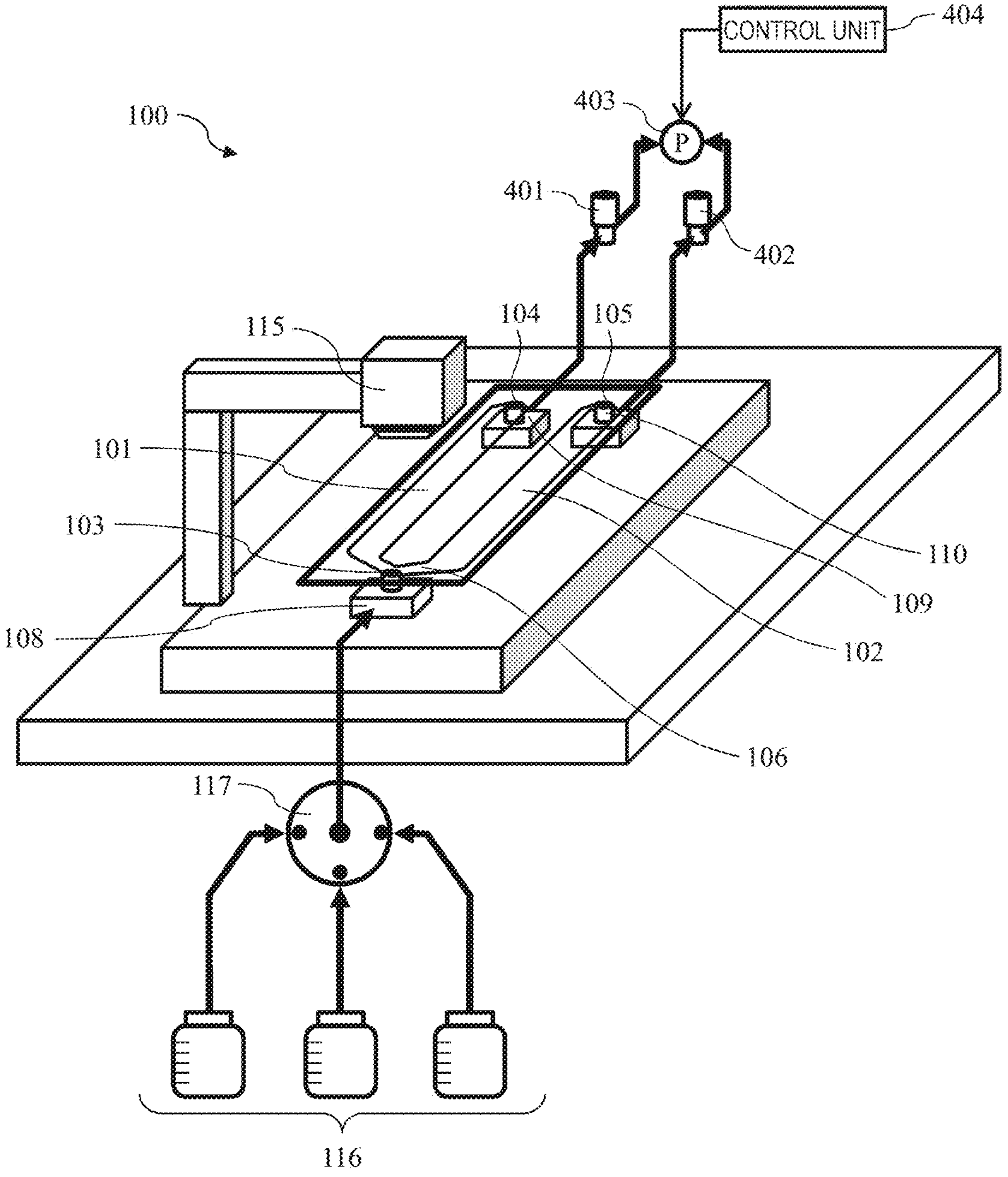
FIG. 4 shows a configuration diagram of the nucleic acid analyzer 100 according to a second embodiment.

FIG. 4 shows a configuration diagram of the nucleic acid analyzer 100 according to a second embodiment of the invention. In FIG. 4, descriptions of parts having the same functions as those of the configuration shown in FIG. 1 will be omitted. In the second embodiment, the discharge flow path 10) is connected to a reagent aspiration mechanism 403 via a first solenoid valve 401, and the discharge flow path 110 is connected to a reagent aspiration mechanism 403 via a second solenoid valve 402. Other configurations are the same as those according to the first embodiment.

In the second embodiment, the control unit 404 (*a*) opens the first solenoid valve 401 when a desired amount of reagent is to be introduced into the flow path 101, and controls the reagent aspiration mechanism 403 via the control unit 404 of the reagent aspiration mechanism in a state where the second solenoid valve 402 is closed, and (b) opens the second solenoid valve 402 when a desired amount of reagent is to be introduced into the flow path 102, and controls the reagent aspiration mechanism 403 in a state where the first solenoid valve 401 is closed.

Specifically, when the substrate 107 is used, the first solenoid valve 401 is opened to introduce the reagent, and then the second solenoid valve 402 is opened to introduce the reagent; when the substrate 301 is used, only the first solenoid valve 401 is opened to introduce the reagent.

The nucleic acid analyzer 100 according to the second embodiment can reduce the number of reagent aspiration mechanisms and the number of control units as compared with the first embodiment. Accordingly, it is possible to simplify a structure particularly after the discharge flow paths.

In FIG. 4, two solenoid valves are provided in order to select a flow path for discharging the reagent, but the flow path can also be selected using one three-way solenoid valve. In addition, the discharge flow path may be selected by other appropriate mechanisms.

Third Embodiment

Figure 5:
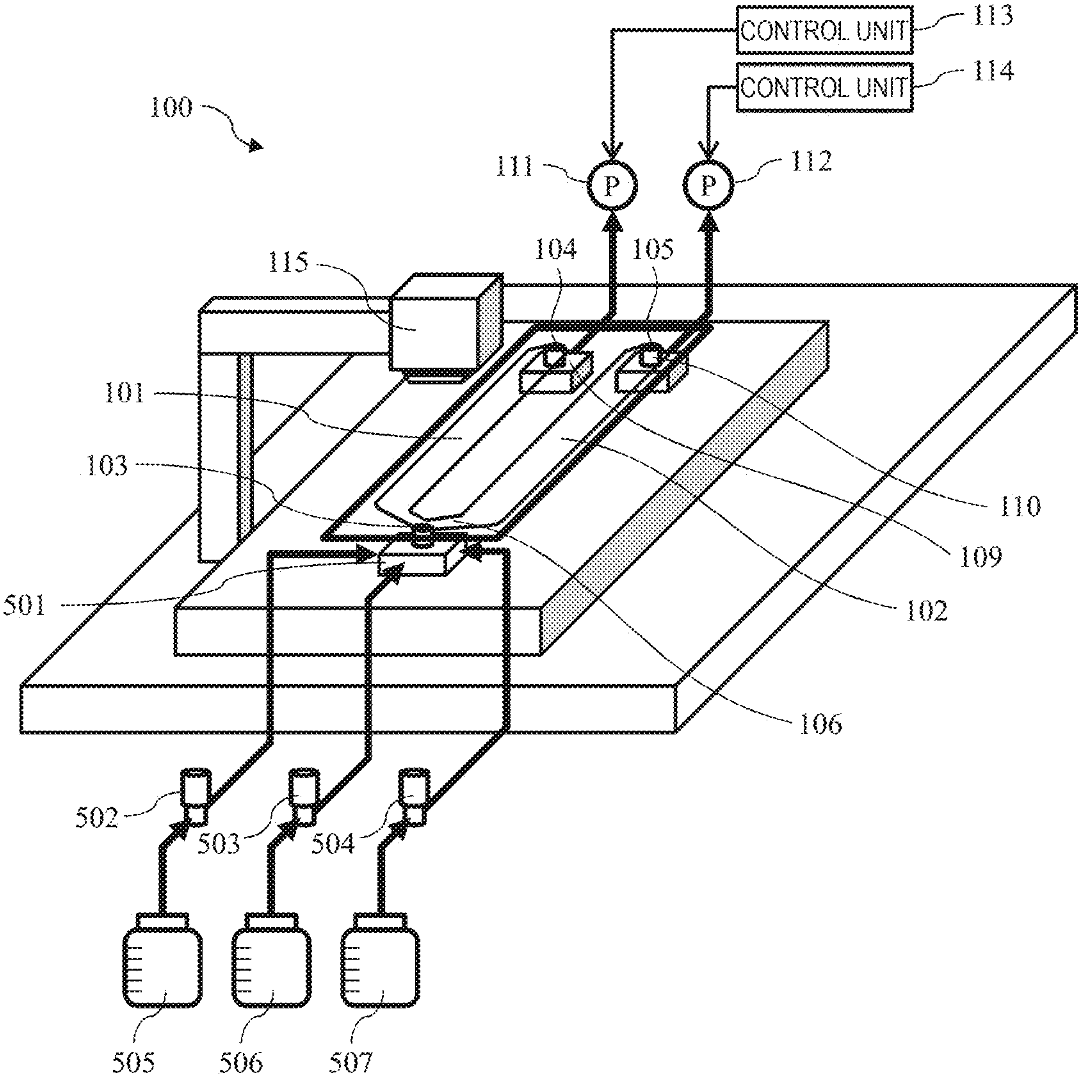
FIG. 5 shows a configuration diagram of the nucleic acid analyzer 100 according to a third embodiment.

FIG. 5 shows a configuration diagram of the nucleic acid analyzer 100 according to a third embodiment of the invention. In FIG. 5, descriptions of parts having the same functions as those of the configuration shown in FIG. 1 will be omitted. In the third embodiment, provided on a reagent introduction side are a block 501, a first reagent selection solenoid valve 502, a second reagent selection solenoid valve 503, a third reagent selection solenoid valve 504, a first reagent container 505, a second reagent container 506, and a third reagent container 507. Other configurations are the same as those according to the first embodiment.

The block 501 includes a plurality of branched flow paths connected to the inlet portion 103. When the first reagent container 505 is connected to the substrate 107, the reagent is aspirated by the reagent aspiration mechanisms 111 and 112 in a state where the first reagent selection solenoid valve 502 is opened and the second reagent selection solenoid valve 503 and the third reagent selection solenoid valve 504 are closed. Similarly, when the second reagent container 506 and the third reagent container 507 are connected to the substrate 107, a desired reagent is selectively introduced into the substrate 107 by opening the corresponding second reagent selection solenoid valve 503 or the corresponding third reagent selection solenoid valve 504. The same applies to a case of using the substrate 301.

Figure 6:
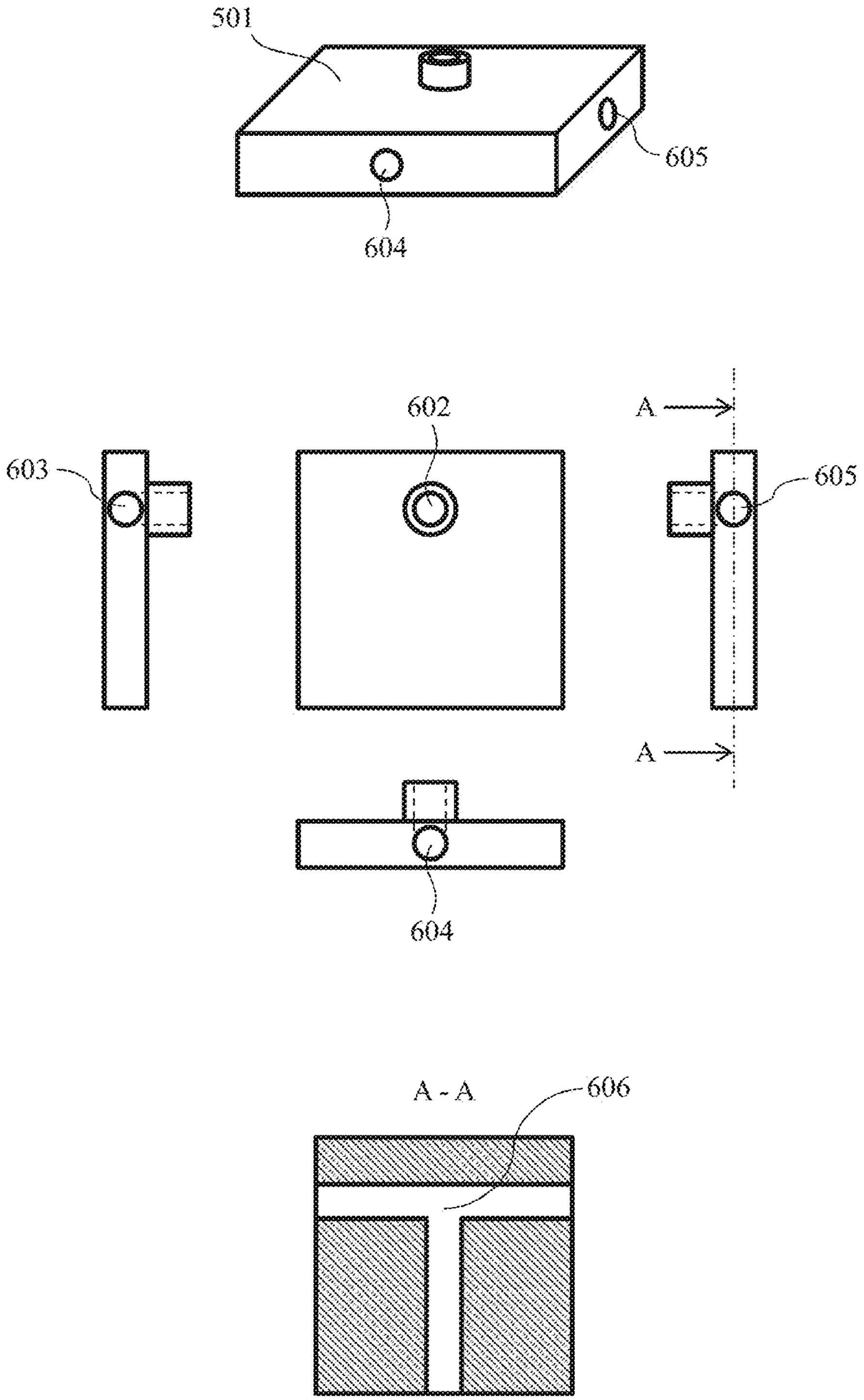
FIG. 6 shows a configuration diagram of a block 501.

FIG. 6 is a configuration diagram of the block 501. An upper part of FIG. 6 is a perspective view, a middle part of FIG. 6 includes a top view, left and right side views, and a front view, and a lower part of FIG. 6 is a cross-sectional view taken along line AA. The block 501 includes an outflow port 602 through which reagents flow out to a substrate and in contact with a flow path of the substrate, a first reagent inflow port 603, a second reagent inflow port 604, and a third reagent inflow port 605.

In the block 501, the branched flow paths from reagent inflow ports merge at a merging point 606 and reach the outflow port 602 through which the reagents flow out to the substrate. Although three reagent inflow ports are provided in FIG. 6, the number of reagent inflow ports may be increased or decreased according to the number of reagents required for reaction, and the number of merging points 606 may also be increased or decreased accordingly.

Fourth Embodiment

Figure 7:
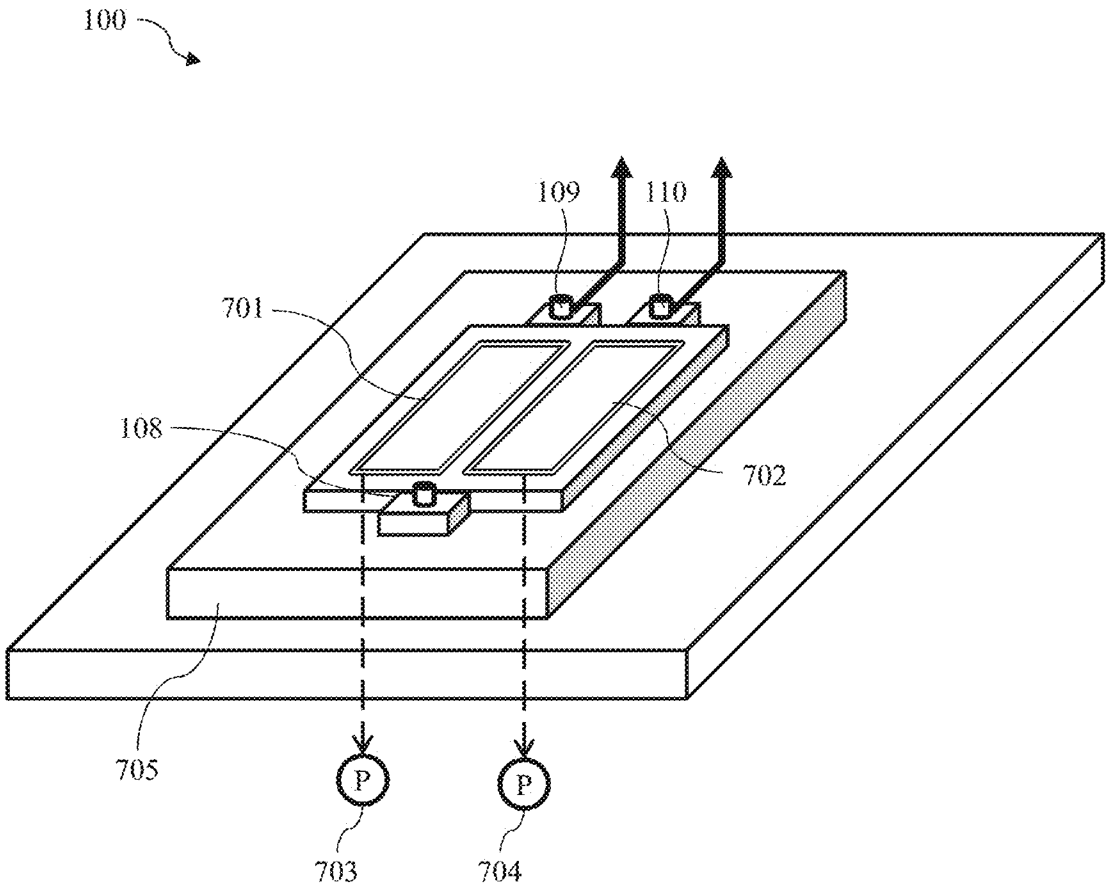
FIG. 7 is a configuration diagram of the nucleic acid analyzer 100 according to a fourth embodiment.

FIG. 7 is a configuration diagram of the nucleic acid analyzer 100 according to a fourth embodiment of the invention. In the fourth embodiment, the nucleic acid analyzer 100 includes grooves 701 and 702 on a stage 705 on which a substrate is placed. The groove 701 is connected to a pump 703, and the pump 703 evacuates the groove 701. The groove 702 is connected to a pump 704, and the pump 704 evacuates the groove 702. The pumps 703 and 704 can be controlled by, for example, the control units 113 and 114, respectively. Other configurations are the same as those according to the first to third embodiments, and thus descriptions thereof are omitted in FIG. 7. The same applies to FIG. 8.

Figure 8:
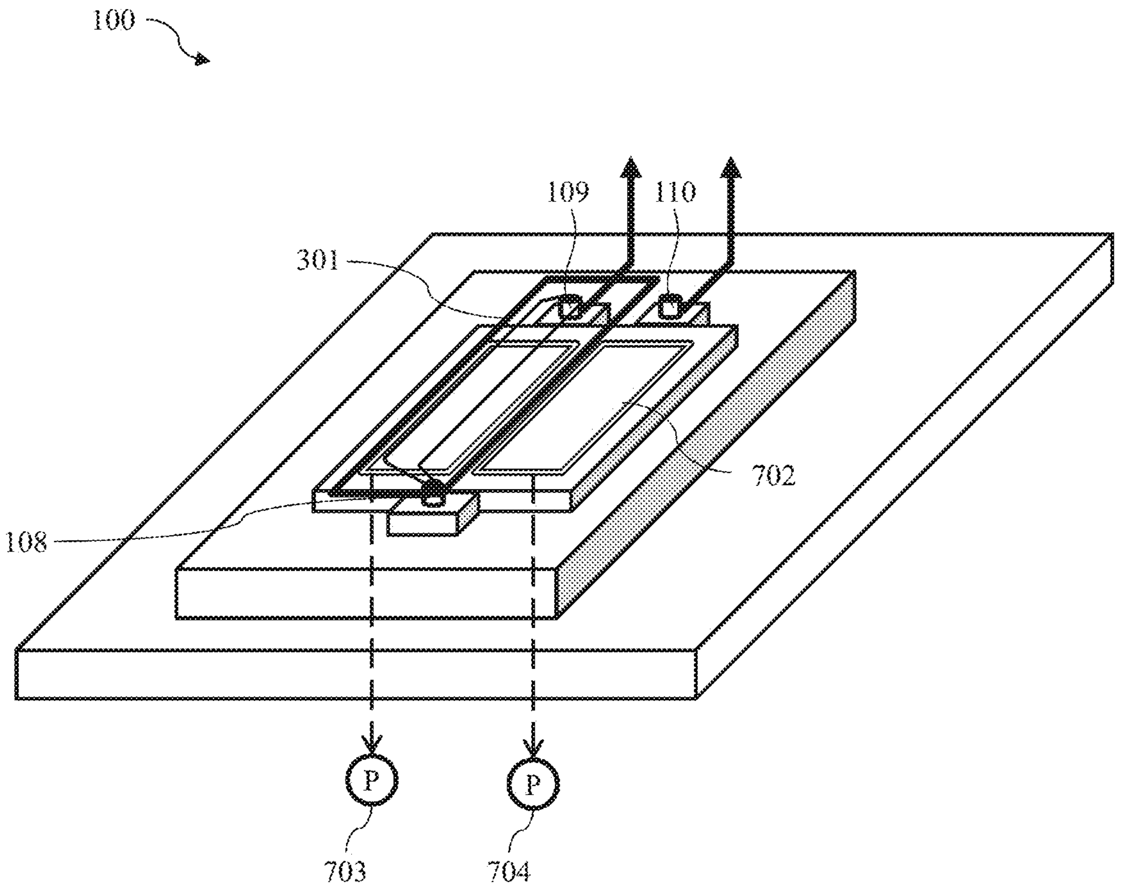
FIG. 8 is a diagram showing a state in which the substrate 301 is used.

FIG. 8 is a diagram showing a state in which the substrate 301 is used. When placed on the stage 705, the substrate 301 has a size and a shape to cover the groove 701 while not overlapping the groove 702. When the substrate 301 is used, the substrate 301 is placed on the groove 701, and the pump 703 aspirates the substrate 301 via the groove 701. Accordingly, the substrate 301 can be fixed on the stage.

When placed on the stage 705, the substrate 107 has a size and a shape to cover both the grooves 701 and 702. Similarly, when the substrate 107 is used, the substrate 107 is placed on the grooves 701 and 702, and the pumps 703 and 704 aspirate the substrate 107 via the grooves 701 and 702, respectively. Accordingly, the substrate 107 can be fixed on the stage.

As in the fourth embodiment, a mechanism that fixes the substrate is divided into a plurality of (two grooves 701 and 702 in FIG. 7) mechanisms, and which fixing mechanism is used is switched according to the size of the substrate. Accordingly, it is possible to flexibly use substrates of various sizes and to reliably fix any substrate.

Although two pumps 703 and 704 are shown in FIG. 7, one pump and a solenoid valve may be used to switch which groove is to be aspirated. Therefore, the number of pumps is set for the sake of convenience as long as which groove is to be aspirated can be switched according to the size of the substrate.

In FIG. 7, the grooves 701 and 702 are disposed on the stage 705, but positions of the grooves are not limited thereto, and may be any positions as long as the substrate covers these grooves when the substrate 107 or the substrate 301 is mounted on the nucleic acid analyzer 100.

Fifth Embodiment

Figure 9:
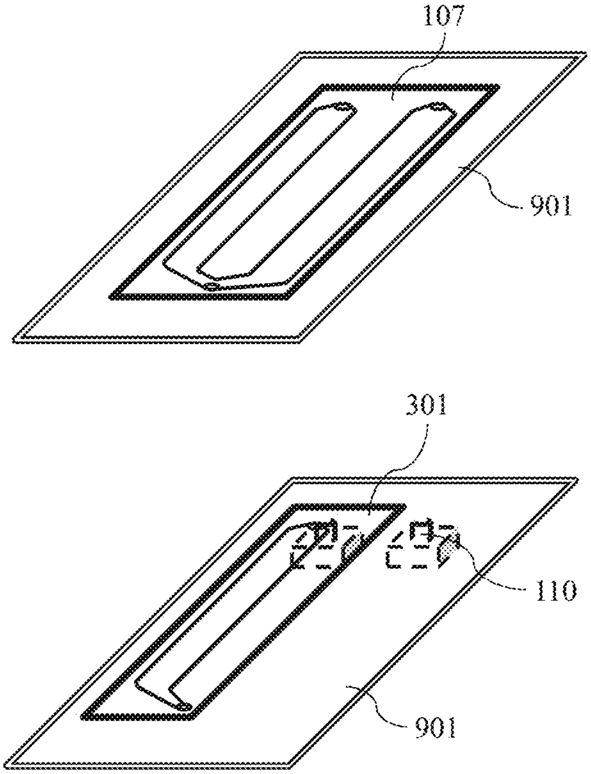
FIG. 9 is a configuration diagram of the substrates 107 and 301 used in the nucleic acid analyzer 100 according to a fifth embodiment.

FIG. 9 is a configuration diagram of the substrates 107 and 301 used in the nucleic acid analyzer 100 according to a fifth embodiment of the invention. Each substrate can be accommodated in a casing 901. The casing 901 may be shared between the substrates 107 and 301, and may be provided with separate substrates having different sizes and made of different materials.

The casing 901 has a planar size slightly larger than the substrate 301. Accordingly, when the substrate 301 is accommodated in the casing 901 and placed on the stage 705, the discharge flow path 110 on a not-used side can be closed. If the discharge flow path 110 is opened for a long time (for example, from about several hours to about several days) without being used, dust or the like may clog the inside of the discharge flow path 110. By attaching the casing 901, such clogging can be prevented even when the substrate 107 is replaced with the substrate 301.

Modifications of Invention

The invention is not limited to the embodiments described above, and includes various modifications. For example, the above-described embodiments are described in detail for easy understanding of the invention, and the invention is not necessarily limited to those including all the configurations described above. Further, a part of a configuration according to one embodiment can be replaced with a configuration according to another embodiment, and the configuration according to another embodiment can be added to the configuration according to one embodiment. A part of a configuration according to each embodiment can be added, deleted, or replaced with another configuration.

In the above embodiments, an imaging range of the imaging mechanism 115 when the substrate 107 is used is larger than that when the substrate 301 is used. Therefore, when the substrate is moved within the imaging range of the imaging mechanism 115, a moving range is larger when the substrate 107 is used. For example, when the substrate is placed on the stage 705 and moved with the stage 705, a moving range of the stage 705 is larger when the substrate 107 is used. Alternatively, if the imaging mechanism 115 can scan an imaging range or an imaging location, the imaging range is larger when the substrate 107 is used.

In the embodiments described above, the control units 113, 114, and 404 can be implemented by hardware such as a circuit device in which functions of the control units are implemented, and can be implemented by an arithmetic device executing software in which the functions of the control units are implemented.

REFERENCE SIGNS LIST

100 nucleic acid analyzer
101 flow path
102 flow path
103 inlet portion
104 outlet portion
105 outlet portion
106 flow path branch point
107 substrate
108 introduction flow path
109 discharge flow path
110 discharge flow path
111 reagent aspiration mechanism
112 reagent aspiration mechanism
113 control unit
114 control unit
115 imaging mechanism
116 reagent container
117 reagent selection mechanism
301 substrate
302 flow path
303 inlet portion
304 outlet portion
401 first solenoid valve
402 second solenoid valve
403 reagent aspiration mechanism
404 control unit
501 block
502 first reagent selection solenoid valve
503 second reagent selection solenoid valve
504 third reagent selection solenoid valve
505 first reagent container
506 second reagent container
507 third reagent container
602 outflow port
603 first reagent inflow port
604 second reagent inflow port
605 third reagent inflow port
606 merging point
701 groove
702 groove
703 pump
704 pump
705 stage
901 casing

The invention claimed is:

1. A nucleic acid analyzer comprising:
a plurality of detachable substrates;
a stage constructed to mount a single one of the plurality of detachable substrates each having a different size in terms of a number of flow paths and each including a reaction field for analyzing a nucleic acid,
wherein the plurality of detachable substrates comprises a first substrate and a second substrate,
wherein the stage comprises;
a single introduction path through which a reagent to be introduced into a mounted one of the plurality of detachable substrates is conveyed;
a first discharge path to receive the reagent discharged from the mounted substrate;
a second discharge path to receive the reagent discharged from the mounted substrate;
a reagent selection mechanism configured to select the reagent to be introduced into the mounted substrate;
an aspiration mechanism configured to aspirate the reagent from upstream sides of the first discharge path and the second discharge path to introduce the reagent into the mounted substrate via the introduction path; and
a first groove and a second groove each formed on a surface of the stage,
wherein the second substrate has a second size different from a first size of the first substrate,
wherein the first substrate includes
an inlet portion connected to the single introduction path;
a first outlet portion connected to the first discharge path;
a second outlet portion connected to the second discharge path;
a first flow path configured to guide the reagent from the inlet portion to the first outlet portion;
a second flow path configured to guide the reagent from the inlet portion to the second outlet portion; and
a single branch portion configured to branch the reagent from the inlet portion to the first flow path and the second flow path, and
the first flow path and the second flow path are connected to each other only at the branch portion and at the inlet portion,
wherein the second substrate includes
a third outlet portion connected to the first discharge path; and
a third flow path configured to guide the reagent from the inlet portion to the third outlet portion,
wherein the second substrate is mounted on the stage,
wherein the aspiration mechanism aspirates the reagent via the third flow path and the third outlet portion and via one of the first discharge path and the second discharge path, to prevent generation of a reagent dead volume in a branched flow path that is not connected to the substrate, and wherein the second substrate has a shape and a planar size such that the first groove is covered with the second substrate and the second substrate does not overlap with the second groove and the second groove is not covered by the second substrate which is the single substrate mounted on the stage.

2. The nucleic acid analyzer according to claim 1, further comprising:

a connection flow path configured to connect a reagent container containing the reagent to the introduction path, wherein the connection flow path does not branch in a path from the reagent container to the introduction path.

3. The nucleic acid analyzer according to claim 1, further comprising:

a first pump configured to aspirate the first substrate via the first groove, wherein the first pump fixes the first substrate to the nucleic acid analyzer by aspirating the first substrate via the first groove, and the first groove is located below the first substrate when the first substrate is attached to the nucleic acid analyzer.

4. The nucleic acid analyzer according to claim 1, further comprising:

a first pump configured to aspirate the first substrate via the first groove; and a second pump configured to aspirate the first substrate via the second groove, wherein the first groove is located below the first substrate when the first substrate is mounted on the stage, the second groove is also located below the first substrate when the first substrate is mounted on the stage but is not located below the second substrate when the second substrate is mounted on the stage, the first substrate has a shape and a planar size such that both the first groove and the second groove are covered with the first substrate when the first substrate is mounted on the stage, the first pump and the second pump fix the first substrate to the nucleic acid analyzer by aspirating the first substrate via the first groove and the second groove, respectively, and the first pump fixes the second substrate to the nucleic acid analyzer by aspirating the second substrate via the first groove.

5. The nucleic acid analyzer according to claim 1, wherein the second substrate is accommodated in a casing, and the casing has a shape and a size to close the second discharge path when the second substrate is mounted on the stage.

6. The nucleic acid analyzer according to claim 1, further comprising:

an imaging mechanism configured to image a specimen flowing through the first substrate or the second substrate, wherein a range in which the imaging mechanism captures an image when the first substrate is mounted on the stage is larger than a range in which the imaging mechanism captures an image when the second substrate is mounted on the stage.

7. The nucleic acid analyzer according to claim 1, wherein the aspiration mechanism includes:

a first aspiration unit connected to the first discharge path; and a second aspiration unit connected to the second discharge path, the first aspiration unit aspirates the reagent via the first discharge path, and the second aspiration unit aspirates the reagent via the second discharge path to introduce the reagent into the first substrate, and the first aspiration unit aspirates the reagent via the first discharge path to introduce the reagent into the second substrate.

8. The nucleic acid analyzer according to claim 1, wherein the aspiration mechanism includes:

an aspiration unit connected to the first discharge path and the second discharge path;

a first valve configured to block or open the first discharge path; and a second valve configured to block or open the second discharge path, the first valve opens the first discharge path, the second valve blocks the second discharge path, and the aspiration unit aspirates the reagent to introduce the reagent into the first flow path, the first valve blocks the first discharge path, the second valve opens the second discharge path, and the aspiration unit aspirates the reagent to introduce the reagent into the second flow path, and one of the first valve and the second valve is opened while the other valve is blocked, and the aspiration unit aspirates the reagent to introduce the reagent into the third flow path.

9. The nucleic acid analyzer according to claim 1, wherein the reagent selection mechanism includes:

a first branch path connected to a first reagent container containing a first reagent;

a second branch path connected to a second reagent container containing a second reagent;

a merging point at which the first branch path and the second branch path merge; and a flow path configured to connect the merging point and the inlet portion.

10. The nucleic acid analyzer according to claim 9, wherein the reagent selection mechanism includes:

a third valve configured to block or open a flow path between the first branch path and the first reagent container; and a fourth valve configured to block or open a flow path between the second branch path and the second reagent container, the reagent selection mechanism selects the first reagent by opening the third valve and blocking the fourth valve, and the reagent selection mechanism selects the second reagent by blocking the third valve and opening the fourth valve.

11. The nucleic acid analyzer according to claim 1, wherein the number of paths configured to convey the reagent discharged from the first substrate is larger than the number of introduction paths.

* * * * *